US006182859B1

(12) United States Patent
Bolen

(10) Patent No.: US 6,182,859 B1
(45) Date of Patent: Feb. 6, 2001

(54) BRUSH HOUSING FOR BULK VENDING MACHINE

(75) Inventor: Richard K. Bolen, Champaign, IL (US)

(73) Assignee: The Northwestern Corporation, Morris, IL (US)

( * ) Notice: Under 35 U.S.C. 154(b), the term of this patent shall be extended for 0 days.

(21) Appl. No.: 09/184,994

(22) Filed: Nov. 3, 1998

(51) Int. Cl.[7] .............................. B65G 59/00; B65H 3/00; G07F 11/16

(52) U.S. Cl. .......................... 221/152; 221/200; 221/203; 221/263

(58) Field of Search .................................... 221/200, 203, 221/204, 263, 264, 265, 152; 267/167, 170

(56) References Cited

U.S. PATENT DOCUMENTS

| | | | | |
|---|---|---|---|---|
| 2,664,227 | * | 12/1953 | Probasco | 221/265 X |
| 2,855,128 | * | 10/1958 | Cookson et al. | 221/168 X |
| 2,880,906 | * | 4/1959 | Probasco | 221/265 X |
| 2,990,975 | * | 7/1961 | Sereno | 221/265 X |
| 4,534,492 | * | 8/1985 | Schwarzli | 221/203 |
| 5,190,133 | * | 3/1993 | Bolen | 221/281 X |
| 5,191,998 | * | 3/1993 | Schwarzli | 221/203 |
| 5,203,849 | * | 4/1993 | Balsells | 267/166 X |

* cited by examiner

*Primary Examiner*—Christopher P. Ellis
*Assistant Examiner*—Gene O. Crawford
(74) *Attorney, Agent, or Firm*—Brinks Hofer Gilson & Lione

(57) ABSTRACT

A bulk vending machine having: a housing having a storage bin to store items; a dispensing mechanism attached to the storage bin to dispense the items, the dispensing mechanism having an opening; a flexible member secured to the dispensing mechanism to assist in ejecting the items through the opening; and a cover disposed around the flexible member to prevent the items from being damaged or breaking open.

19 Claims, 4 Drawing Sheets

BRUSH HOUSING FOR BULK VENDING MACHINE

BACKGROUND OF THE INVENTION

The present invention relates to an improved brush housing for a bulk vending machine and a method of operating the brush housing, and more particularly to a bulk vending machine having an improved brush housing that substantially decreases instances of damaged and broken open items in the vending machine.

Bulk vending machines occupy a special and important position not just because of the sales generated therefrom but because of the unique niche that these machines possess in the minds of the public. The bulk vending machine has endured and thrived as a fixture of the retail environment. At least one bulk vending machine and more likely several, can be found in the entrance way or lobby of nearly every supermarket, department store, hardware store, gas station and restaurant in the United States.

A bulk vending machine typically includes a storage bin or bins for holding bulk merchandise items such as confections or capsules that may contain confections or other items. In addition, the bulk vending machine typically includes a coin receiving mechanism for receiving a coin of the proper denomination, and a bulk dispensing mechanism for dispensing a quantity of the bulk items upon payment of a coin of the proper denomination and the actuation of the coin receiving mechanism.

The bulk dispensing mechanism dispenses a predetermined portion of the bulk merchandise upon payment of a coin or coins into the coin receiving mechanism and operation of a handle. The dispensing mechanism typically incorporates container portions to retain bulk merchandise items and an opening through which such items may pass when the container portion is aligned with the opening.

Two examples of bulk vending machines are the standard Northwestern Model 60 (M60®) and the Triple Play® which is disclosed in U.S. Pat. No. 5,190,133 issued Mar. 2, 1993, the entire disclosure of which is incorporated herein by reference.

The dispensing mechanism of a bulk vending machine typically incorporates a brush housing that prevents more than the required number of items from being dispensed and assists in ejecting items from the bulk vending machine. Conventionally, a brush housing partially shields the opening in the dispensing mechanism, thereby preventing additional items that may be located above the container portion, or items that may be riding on top of items that are in the container portion, from falling through the opening. For example, a conventional brush housing may include a rigid metal deflector bar fixed to the dispensing portion that partially covers the opening and thereby shields the container portion from items that are above it. In addition, some brush housings, include a spring that is fixed to the dispensing portion and contacts an item as the item moves in the container portion over the opening to assist in ejecting the item through the opening.

One drawback with existing brush housings is that items may be damaged when they contact the metal deflector bar or in the case where the item is a capsule, the capsule may break open. In addition, with existing brush housings the items may be damaged when they contact the coils of the spring that is provided to assist in ejecting the items.

Accordingly, it would be desirable in a brush housing for a vending machine to provide a way to prevent more than the required number of items from falling through the dispensing opening while reducing the instances of damaged items and decreasing the number of the items that break open. Further, it would be desirable to provide a means to assist in ejecting items from a vending machine while reducing the occurrence of damaged of broken items.

BRIEF SUMMARY OF THE INVENTION

A new and unique brush housing has been invented that addresses many of the needs noted above.

In a first aspect, the present invention is a bulk vending machine comprising: a housing having a storage bin to store items; a dispensing mechanism attached to the storage bin to dispense the items, the dispensing mechanism having an opening; a flexible member secured to the dispensing mechanism to assist in ejecting the items through the opening; and a cover disposed around the flexible member to prevent the items from being damaged or breaking open.

In another aspect the present invention is a method of dispensing items from a bulk vending machine having a dispensing mechanism with an opening formed therein and a flexible member having a cover, comprising the steps of: rotating the dispensing mechanism until an item is above the opening; and contacting the item with the flexible member to assist in ejecting the item through the opening.

The preferred embodiment of the present invention provides a new and unique brush housing for use in a vending machine which is capable of assisting in ejecting an item from the vending machine and preventing extra items from being dispensed.

The use of a first flexible member having a cover to apply pressure to an item, thereby assisting in ejecting the item, reduces the number of damaged and broken items. Further, the novel brush housing is easy to install.

DETAILED DESCRIPTION OF THE PREFERRED EMBODIMENTS

Figure 1:
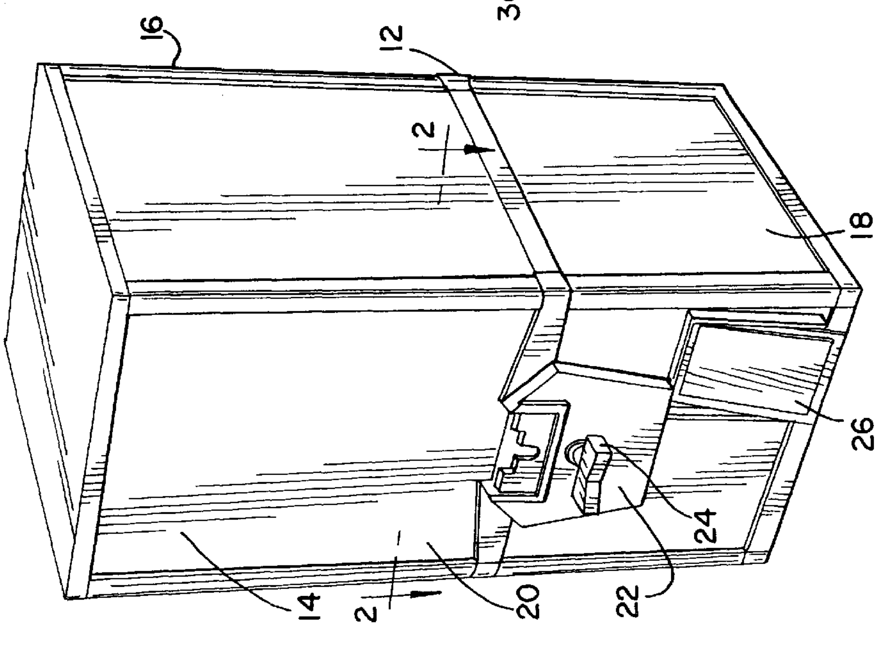
FIG. 1 is a perspective view of a bulk vending machine incorporating an embodiment of the present invention.

Referring to FIG. 1, there is shown a bulk vending machine 10. In one embodiment, the bulk vending machine 10 is similar to a standard M80 bulk vending machine made by Northwestern Corp. of Morris, Ill. The bulk vending machine includes a housing 12 and a storage bin 14. The housing 12 is generally formed from a top portion 16 and a base 18. A window 20, preferably made from clear plastic, is disposed within the top portion 16. The storage bin 14 is located within the top portion 16 behind the window 20.

The bulk vending machine 10 includes a coin receiving portion 22. The coin receiving portion 22 is mounted in a forwardly oriented opening in the base 18. The coin receiving portion 22 actuates a product dispensing mechanism 30, shown in FIG. 2, upon payment of a coin of the proper denomination into the coin receiving portion 22 and operation of a handle 24 in a manner that is well known in the art. Dispensing of the product by the product dispensing mechanism 30 is via a chute 26 located adjacent to the coin receiving portion 22 also located on the base 18. A brush housing 31 is attached to the product dispensing mechanism 30.

Figure 2:
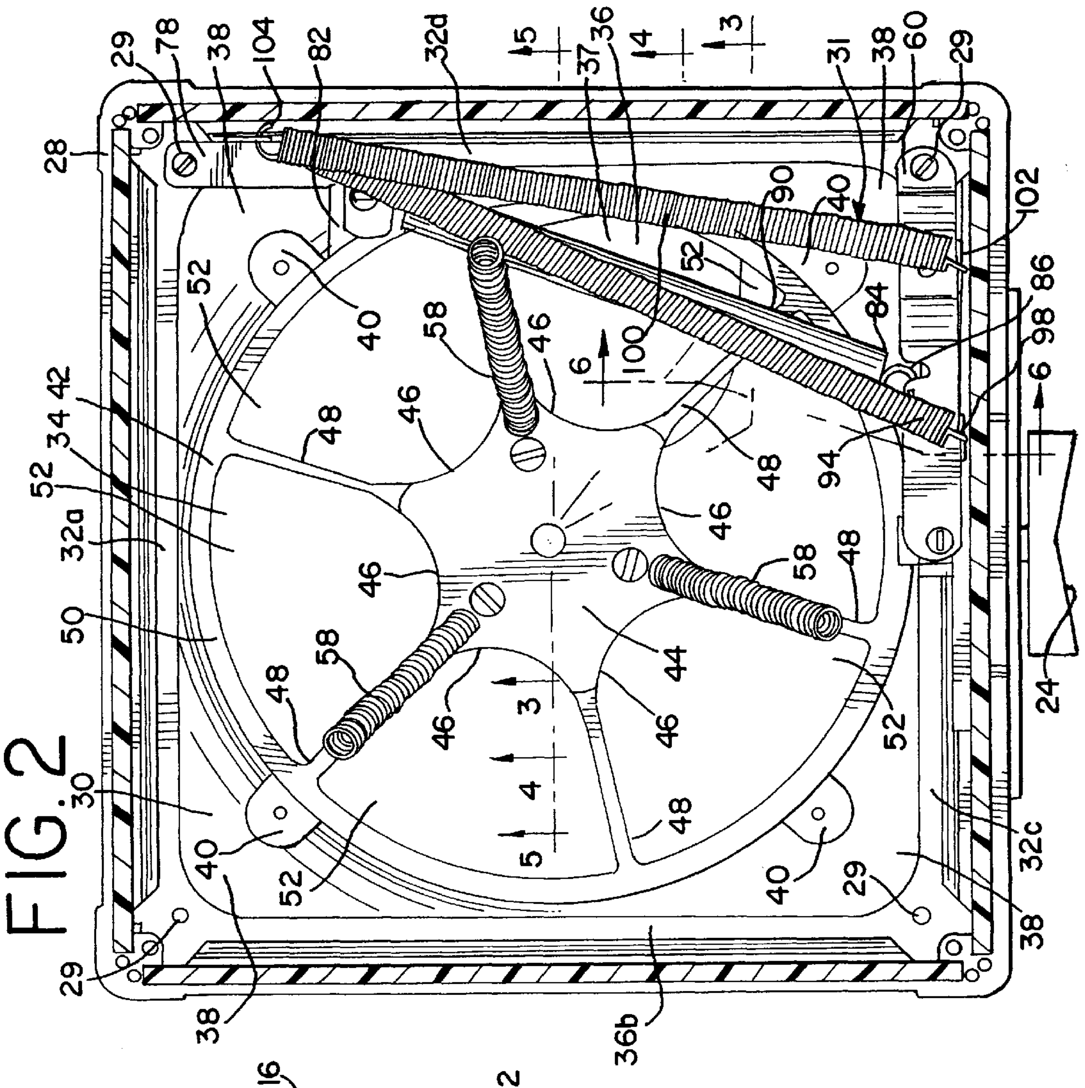
FIG. 2 is a cross-sectional view taken along 2–2' of FIG. 1.

Referring to FIGS. 1 and 2, the storage bin 14 includes the product dispensing mechanism 30. The product dispensing mechanism 30 is generally disposed within the housing 12 at the point where the top portion 16 meets the base 18 and is attached to a mounting frame 28 that is rectangular in shape and is preferably made of metal. The product dispensing mechanism 30 is attached to the mounting frame 28 by placing screws through holes 29 located at its corners.

As shown in FIG. 2, the product dispensing mechanism 30 is preferably rectangular in shape and includes four sides 32*a*, 32*b*, 32*c*, 32*d*. A cylindrical opening 34 having a base 36 is formed in the middle of the product dispensing mechanism 30. An opening 37 with three curved edges is formed near the right (as seen from FIG. 2) perimeter of the base 36. Four comer portions 38 slant down from the sides 32*a*, 32*b*, 32*c*, 32*d* to the edge of the cylindrical opening 34. Each comer portion 38 includes a screwhole 40 that accommodate screws that may be used to secure the product dispensing mechanism 30 to the storage bin 14.

Figure 3:
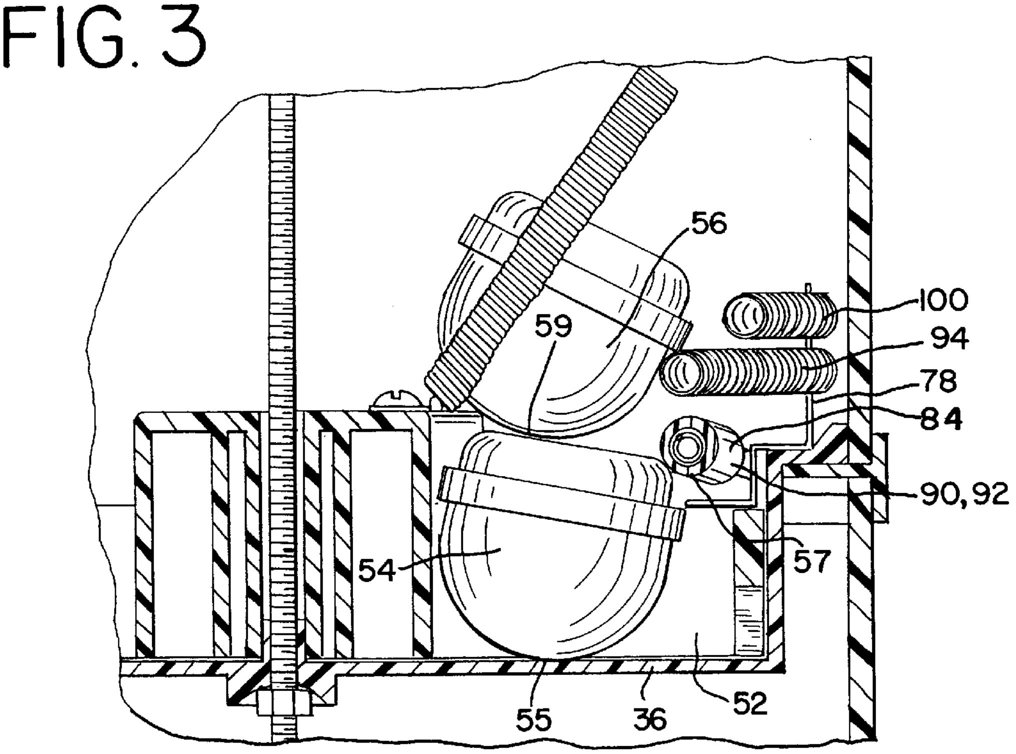
FIG. 3 is a cross-sectional view taken along 3–3' of FIG. 2.

Referring again to FIG. 2, concentrically set into the cylindrical opening 34 is a wheel 42. The wheel 42 includes a center member 44 having a plurality of curved edges 46. Spokes or walls 48 lead from the center member 44 to an outer portion 50. As shown in FIGS. 2 and 3, container portions 52 are formed by the edges 46, the walls 48 and the outer portion 50. The container portions 52 are designed to hold items such as the first item or capsule 54 and the second item or capsule 56 shown in FIG. 3. In a preferred embodiment, the product dispensing mechanism 30 and the wheel 42 are made of materials such as plastic or metal. In a preferred embodiment, the capsules 54, 56 are acorn shaped and preferably come in two sizes, small and large. In a preferred embodiment, the small capsules have a diameter of approximately 1.375 inches and an axial height of about 1.875 inches. The large capsules have a diameter of approximately 1.938 inches and an axial height of about 1.938 inches.

Referring to FIG. 2, three arm members 58 are fixed to the top of the center member 44 using screws. The arm members 44 churn the items within the storage bin when the wheel 42 is turned. In a preferred embodiment the arm members 58 are springs.

In a present embodiment, the brush housing 31 includes at least one flexing deflector, and more preferably a plurality of flexing deflectors. These one or more flexing deflectors serve to prevent more than the paid-for items from entering the container portion 52. These one or more flexing deflectors also reduce the likelihood of inadvertently damaging or breaking open the vended items (i.e., the capsules) by gently directing the vended items either into the container portion 52 or above the container portion 52 as appropriate. In a present embodiment, the flexing deflectors are comprised of three springs, referred to herein as a first flexible member 84, a second flexible member 94, and a third flexible member 100. In alternative embodiments, the flexing deflector may comprise fewer or more springs.

Figure 5:
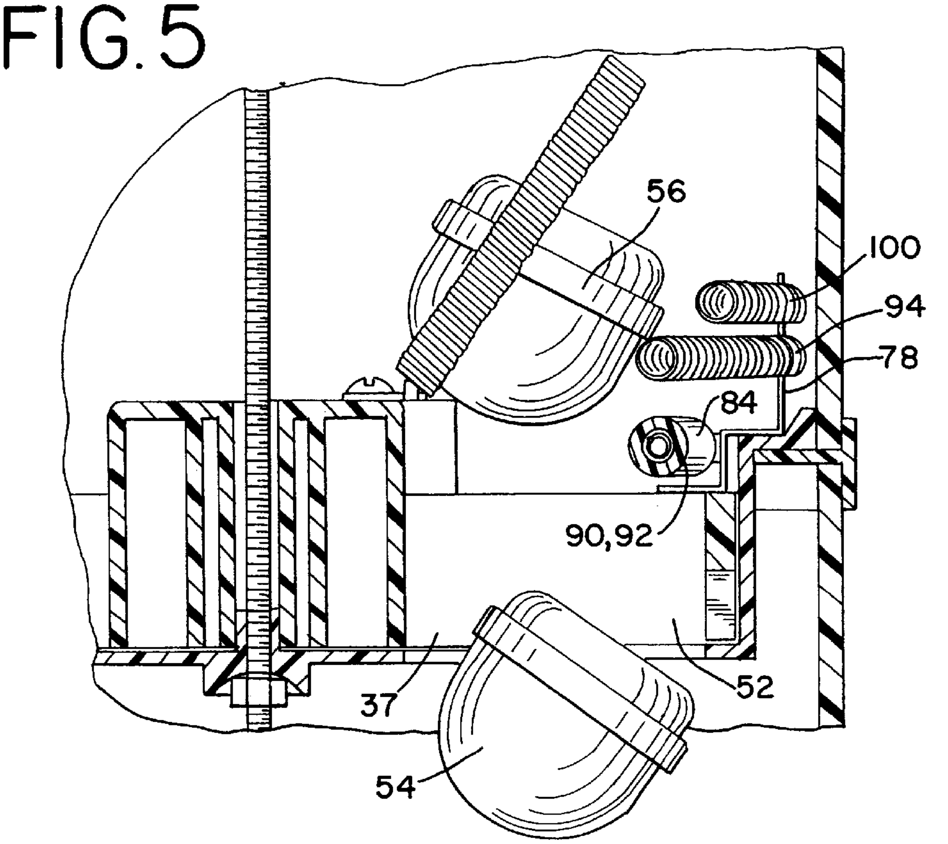
FIG. 5 is a cross-sectional view taken along line 5–5' of FIG. 2.
Figure 6:
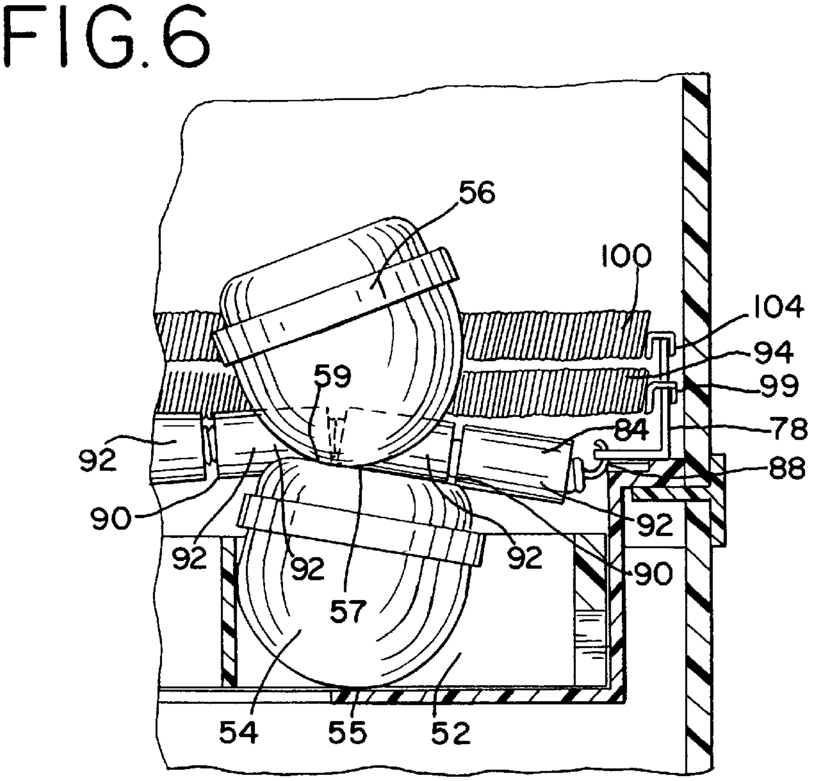
FIG. 6 is a cross-sectional view taken along line 6–6' of FIG. 2.
Figure 7:
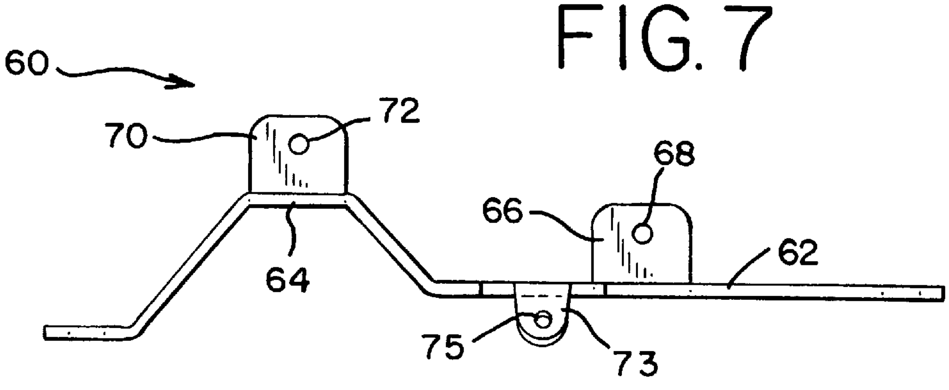
FIG. 7 is an elevational view of a first bracket used in a preferred embodiment used in the present invention.

Referring to FIGS. 2–9 a brush housing 31 is attached to the product dispensing mechanism 30. The brush housing 31 includes the first flexible member 84, the second flexible member 94 and the third flexible member 100 attached to the product dispensing mechanism using a first bracket 60 and a second bracket 78. Referring to FIGS. 2 and 7, a first bracket 60 is fixed using screws to the side 32*c* nearest the handle 24. As shown in FIG. 7, the first bracket 60 includes a generally flat first portion 62 and a raised second portion 64. The first portion 62 includes a first post 66 that has a lower eyelet 68. The second portion 64 includes a second post 70 that has an upper eyelet 72. The middle member 73 is located between the first 66 and second 70 posts on the first portion 62, is angled downward and includes a middle eyelet 75. In a preferred embodiment, the lower eyelet 68 is approximately 0.25 inches above the bottom of the first portion 62, and the upper eyelet 72 is approximately 1.00 inch above the bottom of the second portion 64.

Figure 8:
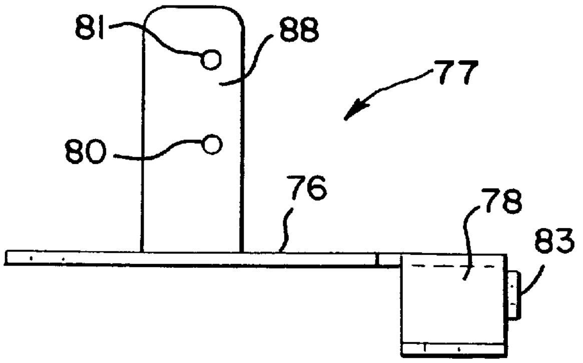
FIG. 8 is an elevational view of a second bracket used in a preferred embodiment of the present invention.
Figure 9:
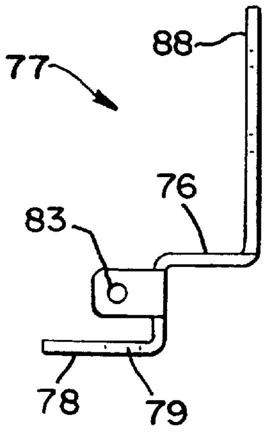
FIG. 9 is a side view of the bracket shown in FIG. 8.

Referring to FIGS. 2, 8 and 9, a second bracket 77 is attached to the right (as viewed from FIG. 2) side 32*d* of the dispensing mechanism 30. As shown in FIGS. 8 and 9, the second bracket 77 includes a first member 76 and a second member 78. The first member 76 is attached to the dispensing mechanism 30 using the screw that fixes the dispensing mechanism 30 to the mounting frame 28. A vertical post 88 extends perpendicularly upward from the first member 76 and includes a first eyelet 80 and a second eyelet 81. The second member 78 is screwed into a depression 82 that is molded into the corner portion 38 in the upper right hand side (as viewed from FIG. 2) of the dispensing mechanism 30. The second member 78 also includes a base 79 and an upper eyelet 83. In a preferred embodiment the first eyelet 80 is approximately 0.551 inches above the first portion 76 and the second eyelet 81 is approximately 1.270 inches above the first portion 76. The upper eyelet 83 is preferably about 0.252 inches above the base 79.

Referring to FIG. 2, 6, 7 and 8, the first flexible member 84 is disposed at an angle with respect to the wall 32*c* nearest the handle 24 and the wall 32*d* to the right of that wall 32*c* (as viewed from FIG. 2). The first flexible member 84 includes a first hook 86 formed at one and a second hook 88 formed at its other end. The first hook 86 is attached to the eyelet 75 disposed in the middle member 73 of the first bracket 60 while the second hook 88 is attached to the upper eyelet 83 that is on the second member 78 of the second bracket 78. The first flexible member 84 is used to assist in ejecting items through the opening 37. In a preferred embodiment the first flexible member 84 is a spring that preferably has a length of approximately 5.73 inches and a diameter of about 0.330 inches. In a preferred embodiment, the eyelet 75 that the first hook 86 is attached to is disposed about 0.25 inches below the first portion 62 of the first bracket 60. The upper eyelet 83 to which the second hook 88 is attached to is preferably located approximately 0.23 inches above the wheel 42. In a preferred embodiment, the first flexible member is disposed at an angle of approximately 18 degrees with respect to the right side 32*a* (as viewed from FIG. 2). In a preferred embodiment the first flexible member is a spring that has 127 R.H. coils, each having a thickness of 0.075 inches. The first flexible member 84 is preferably made from 0.041 music wire and has a tin coat finish.

Referring to FIGS. 2–6, a cover 90 surrounds the first flexible member 84. The cover 90 is made up of a number of tubular sleeves or cylinders 92. In a preferred embodiment, six sleeves 92 are disposed around the flexible member 84 and the sleeves 92 are made of nylon. In a preferred embodiment, the sleeves 92 are rotatable about the flexible member 84 and thereby provide a gentle giving surface that allows an item to slip by without being damaged. The cover prevents items from being caught in or damaged by the first flexible member (i.e. if the first flexible member were a spring with coils). Each sleeve is preferably 0.938 inches long and has an outer diameter of approximately 0.50 inches and an inner diameter of about 0.39 inches.

Referring to FIGS. 2, 6, 7, 8 and 9, the second flexible member 94 is located above the first flexible member 84 and disposed at an angle with respect to the wall 32*c* nearest the handle 24 and the wall 31*d* to the right of that wall (as viewed from FIG. 2). The second flexible member 94 also includes a first hook 98 and a second hook 99 formed at its ends. The first hook 98 is attached to the lower eyelet 68 formed in the first post 66 of the first bracket 60 and the second hook 99 (shown in FIG. 6) is attached to the first eyelet 80 formed in the post 88 of the second bracket 77. The second flexible member 94 preferably has a length of approximately 7.20 inches and a diameter of about 0.330 inches. In a preferred embodiment, the lower eyelet 68 is formed approximately 0.25 inches above the first portion 62 and the first eyelet 80 is formed approximately 0.551 inches above the first member 76. In a preferred embodiment, the second flexible member is disposed at an angle of 20 degrees with respect to the right side wall 32*d* (as viewed from FIG. 2). In a preferred embodiment the second flexible member 94 is a spring that has 133 R.H. coils, each having a thickness of 0.075 inches. The second flexible member 94 is preferably made from 0.041 music wire and has a tin coat finish.

The third flexible member 100 is disposed above the second flexible member 94. The third flexible member 100 also includes a first hook 102 and a second hook 104 formed at its ends. The first hook 102 is attached to the upper eyelet 72 formed in the second post 70 of the first bracket and the second hook 104 is attached to the second eyelet 81 on the post 88 that is on the first portion 76 of the second bracket 77. The third flexible member 100 prevents items in the vending machine from being trapped in one side of the storage bin 22. The third flexible member 62 preferably has a length of approximately 6.50 inches and a diameter of about 0.375 inches. In a preferred embodiment, the upper eyelet 68 is located approximately 0.63 inches above the first portion 62 of the first bracket 60 and the second eyelet 81 is approximately 0.989 inches above the first portion 76 of the second bracket 78. In a preferred embodiment, the third flexible member 100 is disposed at an angle of 8 degrees with respect to the right side 32*d* (as viewed from FIG. 2). In a preferred embodiment the third flexible member 62 is a spring that has 122 R.H. coils, each having a thickness of 0.075 inches. The third flexible member 62 is preferably made from 0.049 music wire and has a tin coat finish.

In a preferred embodiment, a spring tension for the first flexible member 84 should be chosen that is suitable for gently biasing items through the opening. A spring tension for the second flexible member 94 should be chosen that is preferably sufficient to prevent items in the vending machine from being trapped in one side of the storage bin 22. In a preferred embodiment, the first flexible member 84 has a spring tension that is less than the spring tension of the third flexible member 100.

Operation of the improved brush housing 10 will now be described with reference to FIGS. 3–6. FIGS. 3–6 show operation of the brush housing 10 with a first capsule 54 in a container portion of the wheel and a second capsule 56 set on top of the first capsule 54.

Referring to FIGS. 1, 2 and 3 a coin is inserted into the coin mechanism 22 and the wheel 42 is in an initial position. When the wheel 42 is in the initial position shown in FIG. 3, the first capsule 54 is set in a container portion 52. A bottom portion 55 of the first capsule 54 is flush with the openhouse 36 and part of a top portion 57 of the first capsule 54 is contacting the first flexible member 84. Also in this initial position, a lower portion 59 of the second capsule 56 is contacting a part of the top portion 57 of the first capsule 54 and this same lower portion 59 is resting against the second flexible member 94. The second flexible member 94 prevents the second capsule 56 from falling through into the container portion 52 through the opening 37 shown in FIG. 4.

Figure 4:
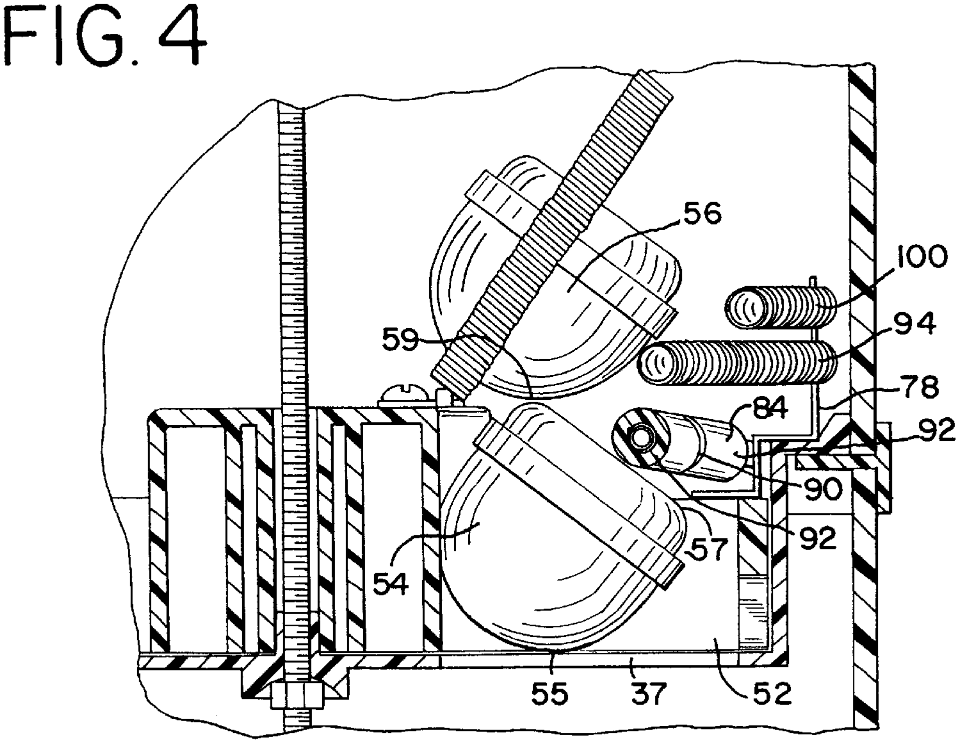
FIG. 4 is a cross-sectional view taken along 4–4' of FIG. 2.

Referring to FIG. 4, after the handle 24 is turned, the wheel 42 rotates to a second position. In the second position, the first capsule 54 is pressed up against the first flexible member 84 such that, as seen in FIG. 6, the first flexible member 84 is substantially deformed. The second capsule 56 continues to rest atop the second flexible member 94.

Referring to FIG. 5, as a result of the first capsule 54 pressing against the first flexible member 84, the first flexible member 84 applies a biasing force to the first capsule 54 that along with the force of gravity causes the first capsule 54 to move downward out of the container portion 56 and through the opening 37. As shown in FIG.6, the second capsule 56 is prevented from falling through the container portion 52 and through the opening 37 by the second flexible member 94.

One of the advantages of the present preferred embodiment of the brush housing 31 is that the use of a first flexible member 84 with a cover 90 to assist in ejecting items prevents items from being damaged or broken open. For example, in the case where the first flexible member 84 is a spring, with a cover 90 comprised of rotatable sleeves, the sleeves rotate and shield the items from the spring, thereby preventing the items from being damaged or somehow caught in the coils of the spring. Items can easily slip by the first flexible member 84 because the cover 90 is rotatable, and thus provides a non-binding surface that is less traumatic on items.

A further advantage of the present embodiment is that the second flexible member 94 prevents a second item 56 that is riding atop a first item 54 in a container portion 52 from falling through the opening 37 and being dispensed, and reduces the chance of this second item 56 from being damaged or broken. In addition, the preferred embodiment of the brush housing 31 is designed to easily replace a prior brush housing and be screwed into the existing metal frame 28 of a bulk vending machine 10.

In an alternative embodiment, the second flexible member and the third flexible member may also have covers. Also, the cover may be made up of a single sleeve as opposed to a series of sleeves. Further instead of springs, the flexible members may be made of another material that is somewhat elastic. In another alternative embodiment the angle of the flexible members with respect to the sidewalls and each other may be changed. Alternatively, the elevation of the flexible members may be varied.

Thus, for vending machines in which breakage or damage of items has been a problem in the past, the existing brush housings can be easily replaced with the new brush housing. The new brush housing is compatible in size and operation with the dispensing mechanisms currently used in vending machine.

Thus, the brush housing can not only be used in new models of vending machines such as the M80 and Model Super 80, but can also be retrofitted in older models by removing the existing brush housing and installing the new one at a minimum cost and using a small number of replacement parts.

It is intended that the foregoing detailed description be regarded as illustrative rather than limiting and it is understood that the following claims including all equivalents are intended to define the scope of the invention.

What is claimed is:

1. A bulk vending machine comprising:

(a) a housing having a storage bin to store items;

(b) a dispensing mechanism attached to said storage bin to dispense said items, said dispensing mechanism having an opening, a first side, and a second side;

(c) a flexible member having a first end and a second end, said first end and second end secured to said first side and said second side, respectively, of said dispensing mechanism to assist in ejecting said items through said opening; and (d) a cover disposed around said flexible member to prevent said items from being damaged or breaking open.

2. The bulk vending machine of claim 1, wherein the cover is comprised of a plurality of cylinders.

3. The bulk vending machine of claim 1, wherein the cover is made of plastic.

4. The bulk vending machine of claim 1, wherein said cover is rotatable about said flexible member.

5. The bulk vending machine of claim 1, wherein said flexible member is positioned at an angle to allow said first item to pass through said opening and to prevent a second item, from passing through said opening.

6. The bulk vending machine of claim 1, wherein the flexible member comprises a first flexible member and wherein the bulk vending machine further comprises a second flexible member spaced apart from said first flexible member to prevent a second item, in contact with said first item, from passing through said opening and being damaged or breaking open.

7. The bulk vending machine of claim 6, wherein the second flexible member has a second cover to protect items from being damaged or breaking open.

8. The bulk vending machine of claim 6, further comprising a third flexible member spaced apart from said second flexible member and positioned at an angle to prevent items from becoming trapped in said housing.

9. The bulk vending machine of claim 8, wherein the third flexible member has a third cover to protect items from being damaged or breaking open.

10. The bulk vending machine of claim 8, wherein said first flexible member, said second flexible member and said third flexible member are springs.

11. A brush housing for a bulk vending machine comprising:

a first flexible member fixed to a dispensing mechanism and capable of assisting a first item to pass through an opening defined in said dispensing mechanism, said first flexible member having a cover to contact said first item to prevent said first item from being damaged or breaking open, said cover comprising a plurality of sleeves, wherein said plurality of sleeves permit the first flexible member to flex when contacted by said first item.

12. The brush housing of claim 11, wherein said cover comprises a plurality of plastic cylinders.

13. The brush housing of claim 11, wherein said cover is rotatable around said first flexible member.

14. The brush housing of claim 11, further comprising a second flexible member spaced apart and above said first flexible member to prevent a second item, in contact with said first item, from being damaged or breaking open.

15. The brush housing of claim 14, further comprising a third flexible member spaced apart and above from said second flexible member to place items in a position to pass through said opening.

16. The brush housing of claim 15 wherein said second flexible member and said third flexible member each have a cover.

17. The brush housing of claim 15 wherein said first flexible member, said second flexible member and said third flexible member are springs.

18. The brush housing of claim 17 wherein said springs are secured to brackets that are fixed on said dispensing mechanism.

19. A bulk vending machine comprising:

(a) a housing having a storage bin to store items;

(b) a dispensing mechanism attached to said storage bin to dispense said items, said dispensing mechanism having an opening, a first side, and a second side; and (c) a flexible elongated member having a first end and a second end, said first end and second end secured to said first side and said second side, respectively, of said dispensing mechanism and aligned above said opening to prevent said items from falling through said opening.

* * * * *